US012781027B2

(12) United States Patent
Yokokawa et al.

(10) Patent No.: US 12,781,027 B2
(45) Date of Patent: Nov. 3, 2026

(54) MOLDING MATERIAL

(71) Applicant: SEIKO EPSON CORPORATION, Tokyo (JP)

(72) Inventors: Shinobu Yokokawa, Okaya (JP); Shintaro Asai, Matsumoto (JP); Hirofumi Hokari, Chino (JP); Atsushi Yamada, Chino (JP); Toshihiro Otake, Chino (JP)

(73) Assignee: SEIKO EPSON CORPORATION (JP)

( * ) Notice: Subject to any disclaimer, the term of this patent is extended or adjusted under 35 U.S.C. 154(b) by 398 days.

(21) Appl. No.: 18/619,813

(22) Filed: Mar. 28, 2024

(65) Prior Publication Data

US 2024/0327620 A1 Oct. 3, 2024

(30) Foreign Application Priority Data

Mar. 29, 2023 (JP) ................................. 2023-053393

(51) Int. Cl.
*C08L 1/12* (2006.01)
*C08J 5/04* (2006.01)

(52) U.S. Cl.
CPC ................. *C08L 1/12* (2013.01); *C08J 5/045* (2013.01); *C08J 2301/12* (2013.01); *C08L 2205/025* (2013.01); *C08L 2205/03* (2013.01); *C08L 2205/16* (2013.01)

(58) Field of Classification Search
CPC ............................... C08L 2205/16; C08L 1/14
See application file for complete search history.

(56) References Cited

U.S. PATENT DOCUMENTS

2003/0124937 A1 7/2003 Williams et al.
2019/0276637 A1* 9/2019 Yao ........................... C08L 1/14

FOREIGN PATENT DOCUMENTS

JP 2005-504184 A 2/2005

OTHER PUBLICATIONS

Chen, ACS Sustainable Chem. Eng. 2018, 6, 4931-4939. (Year: 2018).*

* cited by examiner

*Primary Examiner* — Layla D Berry
(74) *Attorney, Agent, or Firm* — Harness, Dickey & Pierce, P.L.C.

(57) ABSTRACT

The molding material of the present disclosure includes a cellulose fiber and a specific cellulose derivative in which a part of the hydrogen atoms constituting the hydroxy groups of cellulose is substituted with a chemical structure represented by the following formula (1) and another part of the hydrogen atoms is substituted with a chemical structure represented by the following formula (2), wherein the content of the cellulose fiber is 50 mass % or more and 70 mass % or less.

$$-(C{=}O)R_B \qquad (1)$$

$$-(C{=}O)R_C-IL \qquad (2)$$

6 Claims, 3 Drawing Sheets

FIG. 1

| | FORMULA (1) | | FORMULA (2) | | | | |
|---|---|---|---|---|---|---|---|
| | NUMBER OF CARBON ATOMS OF $R_B$ | DS VALUE | NUMBER OF CARBON ATOMS OF $R_C$ | IL FORMULA | IL n VALUE | DS VALUE | COUNTER ION FORMULA |
| SYNTHESIS EXAMPLE 1 | 1 | 2.0 | 3 | (3) | 2 | 0.2 | (5) (WHERE $R=CH_3$) |
| SYNTHESIS EXAMPLE 2 | 3 | 2.0 | 3 | (3) | 2 | 0.2 | (5) (WHERE $R=CH_3$) |
| SYNTHESIS EXAMPLE 3 | 6 | 2.0 | 3 | (3) | 2 | 0.2 | (5) (WHERE $R=CH_3$) |
| SYNTHESIS EXAMPLE 4 | 10 | 2.0 | 3 | (3) | 2 | 0.2 | (5) (WHERE $R=CH_3$) |
| SYNTHESIS EXAMPLE 5 | 3 | 2.0 | 3 | (3) | 2 | 0.2 | (5) (WHERE $R=CH_2CH_3$) |
| SYNTHESIS EXAMPLE 6 | 3 | 2.0 | 3 | (3) | 2 | 0.2 | (5) (WHERE $R=(CH_2)_3CH_3$) |
| SYNTHESIS EXAMPLE 7 | 3 | 2.0 | 6 | (3) | 2 | 0.2 | (5) (WHERE $R=CH_3$) |
| SYNTHESIS EXAMPLE 8 | 3 | 2.0 | 10 | (3) | 2 | 0.2 | (5) (WHERE $R=CH_3$) |
| SYNTHESIS EXAMPLE 9 | 3 | 2.0 | 3 | (3) | 1 | 0.2 | (5) (WHERE $R=CH_3$) |
| SYNTHESIS EXAMPLE 10 | 3 | 2.0 | 3 | (3) | 1 | 0.2 | (5) (WHERE $R=CH_2CH_3$) |
| SYNTHESIS EXAMPLE 11 | 3 | 2.0 | 3 | (3) | 1 | 0.2 | (5) (WHERE $R=(CH_2)_3CH_3$) |
| SYNTHESIS EXAMPLE 12 | 3 | 2.0 | 3 | (4) | 3 | 0.2 | ABSENCE (BETAINE) |
| SYNTHESIS EXAMPLE 13 | 3 | 2.0 | 3 | (4) | 4 | 0.2 | ABSENCE (BETAINE) |
| SYNTHESIS EXAMPLE 14 | 3 | 2.0 | 3 | (4) | 5 | 0.2 | ABSENCE (BETAINE) |

FIG. 2

| | | | EXAMPLE | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| COMPOSITION | CELLULOSE FIBER | | 60 | 60 | 60 | 60 | 60 | 60 | 60 | 60 | 70 | 60 | 60 | 60 | 60 |
| | CELLULOSE DERIVATIVE | SYNTHESIS EXAMPLE 1 | 20 | – | – | – | – | – | – | – | – | – | – | – | – |
| | | SYNTHESIS EXAMPLE 2 | – | 20 | – | 10 | 20 | 20 | 30 | 40 | 30 | 20 | 10 | – | – |
| | | SYNTHESIS EXAMPLE 3 | – | – | 20 | – | – | – | – | – | – | – | – | – | – |
| | | SYNTHESIS EXAMPLE 5 | – | – | – | – | – | – | – | – | – | – | – | 20 | – |
| | | SYNTHESIS EXAMPLE 6 | – | – | – | – | – | – | – | – | – | – | – | – | 20 |
| | CAP | | 20 | 20 | 20 | 30 | 20 | – | 10 | – | – | – | – | 20 | 20 |
| | CAB | | – | – | – | – | – | – | – | – | – | 20 | – | – | – |
| | DAC | | – | – | – | – | – | – | – | – | – | – | 30 | – | – |
| | FLAME RETARDANT | | – | – | – | – | – | 10 | – | – | – | – | – | – | – |
| | ANTIOXIDANT | | – | – | – | – | – | 0.5 | – | – | – | – | – | – | – |
| MOLDING METHOD OF MOLDED PRODUCT | | | INJECTION | INJECTION | INJECTION | INJECTION | INJECTION | INJECTION | INJECTION | INJECTION | INJECTION | INJECTION | INJECTION | INJECTION | INJECTION |
| EVALUATION | BENDING ELASTIC MODULUS | | A | B | A | A | A | A | B | C | A | A | C | C | C |
| | BENDING STRENGTH | | B | C | B | C | A | B | A | A | B | A | B | B | C |
| | CHARPY IMPACT STRENGTH | | A | B | B | A | A | A | A | A | B | A | B | B | A |
| | MFR | | B | B | A | A | A | A | B | C | A | C | B | B | C |

FIG. 3

| | | | EXAMPLE | | | | | | | COMPARATIVE EXAMPLE | | |
|---|---|---|---|---|---|---|---|---|---|---|---|---|
| | | | 14 | 15 | 16 | 17 | 18 | 19 | 20 | 1 | 2 | 3 |
| COMPOSITION | CELLULOSE FIBER | | 60 | 60 | 60 | 60 | 60 | 60 | 60 | 80 | 60 | 60 |
| | CELLULOSE DERIVATIVE | SYNTHESIS EXAMPLE 2 | — | — | — | — | — | — | — | 20 | — | — |
| | | SYNTHESIS EXAMPLE 4 | — | — | — | — | — | — | — | — | 20 | — |
| | | SYNTHESIS EXAMPLE 7 | 20 | — | — | — | — | — | — | — | — | — |
| | | SYNTHESIS EXAMPLE 8 | — | — | — | — | — | — | — | — | — | 20 |
| | | SYNTHESIS EXAMPLE 9 | — | 20 | — | — | — | — | — | — | — | — |
| | | SYNTHESIS EXAMPLE 10 | — | — | 20 | — | — | — | — | — | — | — |
| | | SYNTHESIS EXAMPLE 11 | — | — | — | 20 | — | — | — | — | — | — |
| | | SYNTHESIS EXAMPLE 12 | — | — | — | — | 20 | — | — | — | — | — |
| | | SYNTHESIS EXAMPLE 13 | — | — | — | — | — | 20 | — | — | — | — |
| | | SYNTHESIS EXAMPLE 14 | — | — | — | — | — | — | 20 | — | — | — |
| | CAP | | 30 | 30 | 30 | 30 | 30 | — | 50 | — | 30 | 30 |
| MOLDING METHOD OF MOLDED PRODUCT | | | INJECTION | INJECTION | INJECTION | INJECTION | INJECTION | INJECTION | INJECTION | PRESSING | INJECTION | INJECTION |
| EVALUATION | BENDING ELASTIC MODULUS | | B | B | A | C | C | C | C | D | B | D |
| | BENDING STRENGTH | | C | B | A | B | B | B | B | C | D | B |
| | CHARPY IMPACT STRENGTH | | A | B | A | A | B | B | A | A | C | A |
| | MFR | | B | C | B | A | A | A | A | D | A | D |

MOLDING MATERIAL

The present application is based on, and claims priority from JP Application Serial Number 2023-053393, filed Mar. 29, 2023, the disclosure of which is hereby incorporated by reference herein in its entirety.

BACKGROUND

1. Technical Field

The present disclosure relates to a molding material.

2. Related Art

As a countermeasure against oil depletion and global warming, attempts are being made to replace existing plastic materials with molding materials that utilize cellulose, which is an abundant natural material derived from plants.

For example, as a non-woven web or composite structure that can be disposed of in a composting landfills, molded products including natural cellulose fibers and cellulose esters such as cellulose acetate butyrate and cellulose acetate propionate have been proposed (see JP-T-2005-504184).

However, there are problems that such a molded product has poor strength and shock resistance and that moldability during manufacturing the molded product is poor.

SUMMARY

The present disclosure has been made to solve the above problems, and can be realized as the following application examples.

The molding material according to the application example of the present disclosure includes a cellulose fiber and a specific cellulose derivative in which a part of the hydrogen atoms constituting the hydroxy groups of cellulose is substituted with a chemical structure represented by the following formula (1) and another part of the hydrogen atoms is substituted with a chemical structure represented by the following formula (2), wherein the content of the cellulose fiber is 50 mass % or more and 70 mass % or less:

$$—(C{=}O)R_B \quad (1)$$

(in the formula (1), $R_B$ is an alkyl group having 1 to 6 carbon atoms);

$$—(C{=}O)R_C—IL \quad (2)$$

(in the formula (2), $R_c$ is an alkylene group having 3 to 6 carbon atoms, and IL is represented by either a formula (3) or a formula (4))

(3)

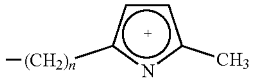

(in the formula (3), n is an integer of 1 or more and 5 or less); and (4)

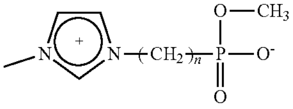

(in the formula (4), n is an integer of 1 or more and 8 or less).

BRIEF DESCRIPTION OF THE DRAWINGS

FIG. 1 is a table collectively showing conditions of cellulose derivatives synthesized in the respective Synthesis Examples.

FIG. 2 is a table collectively showing the compositions, molding methods, and evaluation results of the molding materials of Examples 1 to 13.

FIG. 3 is a table collectively showing the compositions, molding methods, and evaluation results of the molding materials of Examples 14 to 20 and Comparative Examples 1 to 3.

DESCRIPTION OF EMBODIMENTS

Suitable embodiments of the present disclosure will now be described in detail.

[1] Molding Material

A molding material of the present disclosure will be described first.

The molding material of the present disclosure includes a cellulose fiber and a specific cellulose derivative in which a part of the hydrogen atoms constituting the hydroxy groups of cellulose is substituted with a chemical structure represented by the following formula (1) and another part of the hydrogen atoms is substituted with a chemical structure represented by the following formula (2), wherein the content of the cellulose fiber in the molding material is 50 mass % or more and 70 mass % or less, $$—(C{=}O)R_B \quad (1)$$

(in the formula (1), $R_B$ is an alkyl group having 1 to 6 carbon atoms);

$$—(C{=}O)R_C—IL \quad (2)$$

(in the formula (2), $R_c$ is an alkylene group having 3 to 6 carbon atoms, and IL is represented by either a formula (3) or a formula (4));

(3)

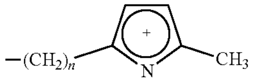

(in the formula (3), n is an integer of 1 or more and 5 or less); and

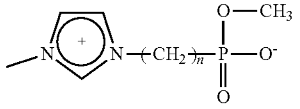
(4)

(in the formula (4), n is an integer of 1 or more and 8 or less).

Such a configuration can provide a molding material that includes a cellulose fiber in a prescribed content range, i.e., a sufficiently high content of 50 mass % or more and 70 mass % or less, can be suitably used for manufacturing a molded product excellent in strength and shock resistance, and has excellent moldability during manufacturing the molded product.

The reasons why such excellent effects can be obtained are thought to be as follows: when the molding material includes cellulose having high theoretical strength and excellent shape stability and also includes a specific cellulose derivative having excellent compatibility and affinity with cellulose fibers and excellent heat resistance and toughness and also having excellent fluidity during melting, the functions of these components are prevented or suppressed from cancelling each other, and the functions of these components can be fully exhibited. More specifically, during manufacturing a molded product using a molding material and in a molded product manufactured using a molding material, while fully exhibiting the functions of a cellulose fiber and a specific cellulose derivative, the wettability of the specific cellulose derivative to the cellulose fiber can be increased, and the interfacial peeling between different components constituting the molded product can be suitably prevented and suppressed. As a result, it is thought that the excellent effects mentioned above can be obtained.

Since the interfacial peeling between different components constituting the molded product can be suitably prevented and suppressed, a molded product that effectively prevents problems such as dust generation can be obtained.

When a cellulose fiber, which is an abundant natural material derived from plants, is included at a high content, it is possible to appropriately respond to environmental problems and underground resource saving and so on, and it is also advantageous from the viewpoint of stable supply, cost reduction, and so on of a molding material and a molded product manufactured using it. A cellulose fiber is a component that is included in large amounts in, for example, waste paper and waste cloth in addition to virgin pulp and is also advantageous from the viewpoint of promoting the effective reuse of resources.

The specific cellulose derivative can be suitably obtained using such cellulose described above as a raw material and is a component generally having excellent biodegradability. Consequently, also the entire molding material or the entire molded product manufactured using the molding material can appropriately deal with environmental problems and so on.

In contrast, if the above conditions are not fulfilled, satisfactory results cannot be obtained.

For example, even if the molding material includes a cellulose fiber, if the specific cellulose derivative is not included, the molded product manufactured using the molding material is significantly inferior in shock resistance and so on, and the moldability during manufacturing the molded product is poor.

In addition, when the specific cellulose derivative is not included and another cellulose derivative is used instead of the specific cellulose derivative, the molded product manufactured using the molding material is inferior in strength and shock resistance, and the moldability during manufacturing the molded product is poor.

For example, when a cellulose derivative having a chemical structure represented by the above formula (1) but not having a chemical structure represented by the above formula (2) is used instead of the specific cellulose derivative, compatibility between the cellulose fiber and other materials contained therein cannot be ensured, and the respective materials are phase-separated to make it impossible guarantee molding properties.

In addition, when a cellulose derivative having a chemical structure represented by the above formula (2) but not having a chemical structure represented by the above formula (1) is used instead of the specific cellulose derivative, since the side chain is highly polar, the moisture resistance and water resistance of the molded product are decreased.

When a cellulose derivative having a substituent in which $R_B$ in the formula (1) is a hydrogen atom is used instead of the specific cellulose derivative, interaction between fibers strongly acts by a hydrogen bond between hydroxy groups of the cellulose fiber or the derivative, and defiberization does not proceed.

When a cellulose derivative having a substituent in which $R_B$ in the formula (1) is an alkyl group having 7 or more carbon atoms is used instead of the specific cellulose derivative, the glass transition temperature and melting point of the derivative decrease, and the heat resistance of the obtained molded product cannot be guaranteed.

When a cellulose derivative having a substituent in which $R_c$ in the formula (2) is an alkylene group having 2 or less carbon atoms is used instead of the specific cellulose derivative, compatibility with the cellulose fiber cannot be ensured due to the steric hindrance by the chemical structure represented by the formula (1).

When a cellulose derivative having a substituent in which $R_c$ in the formula (2) is an alkylene group having 7 or more carbon atoms is used instead of the specific cellulose derivative, the glass transition temperature and melting point of the derivative decrease, and the heat resistance of the obtained molded product cannot be guaranteed.

When a cellulose derivative in which IL in the formula (2) is substituted with an atom or group of a chemical structure other than the chemical structures represented by the formulae (3) and (4) is used instead of the specific cellulose derivative, the affinity between the structure of IL and the chemical structure of the cellulose skeleton is insufficient, and the complexation at the molecular level does not progress.

Even when the molding material includes a cellulose fiber and a specific cellulose derivative, if the content of the cellulose fiber in the molding material is less than the lower limit, the effects by including the above-described cellulose fiber are not sufficiently exhibited.

Even when the molding material includes a cellulose fiber and a specific cellulose derivative, if the content of the cellulose fiber in the molding material is higher than the upper limit, the content of the specific cellulose derivative is relatively decreased, the formability of the molded product and the shock resistance and so on of the molded product are sharply decreased.

[1-1] Cellulose Fiber

The molding material of the present disclosure includes a cellulose fiber.

The cellulose fiber is the main component of the molding material of the present disclosure and is a component that highly contributes to maintenance of the shape of the molded product manufactured using the molding material of the present disclosure and significantly affects the properties, such as strength, of the molded product.

Cellulose is an abundant natural material derived from plants. Accordingly, when a cellulose fiber is used, it is possible to appropriately respond to environmental problems and underground resource saving and so on, and it is also advantageous from the viewpoint of stable supply, cost reduction, and so on of a molding material and a molded product manufactured using it. Among various fibers, the cellulose fiber has particularly high theoretical strength and is advantageous also from the viewpoint of improving the strength of the molded product.

As the cellulose fiber, virgin pulp may be used, or waste paper, waste cloth, and so on may be reused.

The cellulose fiber is generally mainly composed of cellulose, but may include a component other than cellulose. Example of such component include hemicellulose and lignin.

The cellulose fiber may be subjected to treatment such as bleaching.

Examples of the cellulose fiber include cotton, linen, rayon, and cupra.

The content of the cellulose fiber in the molding material of the present disclosure may be, as described above, 50 mass % or more and 70 mass % or less, 52 mass % or more and 68 mass % or less, 54 mass % or more and 66 mass % or less, or 56 mass % or more and 64 mass % or less.

Consequently, the above-described effects by the present disclosure are more significantly exhibited.

The average length of the cellulose fiber is not particularly limited, but may be 1 μm or more and 5000 μm or less or 1 μm or more and 400 μm or less.

Consequently, the shape stability, strength, and so on of the molded product manufactured using the molding material can be more improved. In addition, the dust generation in the molded product manufactured using the molding material can be more effectively prevented and suppressed. Furthermore, occurrence of unwanted unevenness on the surface of the molded product manufactured using the molding material can be more effectively prevented. The fiber length of the cellulose fiber is determined by a method in accordance with ISO 16065-2:2007.

The average thickness of the cellulose fiber is not particularly limited, but may be 1 μm or more and 100 μm or less or 1 μm or more and 20 μm or less.

Consequently, the shape stability, strength, and so on of the molded product manufactured using the molding material can be more improved. In addition, occurrence of unwanted unevenness on the surface of the molded product manufactured using the molding material can be more effectively prevented.

The average aspect ratio of the cellulose fiber, that is, the ratio of the average length to the average thickness, is not particularly limited, but may be 10 or more and 1000 or less or 15 or more and 100 or less.

Consequently, the shape stability, strength, and so on of the molded product manufactured using the molding material can be more improved. The dust generation in the molded product manufactured using the molding material can be more effectively prevented and suppressed. In addition, occurrence of unwanted unevenness on the surface of the molded product manufactured using the molding material can be more effectively prevented.

[1-2] Specific Cellulose Derivative

The molding material of the present disclosure includes a specific cellulose derivative.

The specific cellulose derivative is a compound in which a part of the hydrogen atoms constituting the hydroxy groups of cellulose is substituted with a chemical structure represented by the above formula (1) and another part of the hydrogen atoms is substituted with a chemical structure represented by the above formula (2).

$R_B$ in the formula (1) is an alkyl group having 1 to 6 carbon atoms and may be an alkyl group having 2 to 6 carbon atoms or an alkyl group having 3 to 5 carbon atoms.

Consequently, the strength and shock resistance of the molded product manufactured using the molding material can be more improved, and the moldability during manufacturing the molded product can be more improved.

The specific cellulose derivative may have chemical structures having different conditions with each other in the molecule as the chemical structures represented by the above formula (1).

In the specific cellulose derivative, the DS value of the chemical structure represented by the formula (1), that is, the substitution degree that is the value corresponding to the number of hydrogen atoms that have been substituted with the chemical structure represented by the formula (1) in the hydrogen atoms of all the hydroxy groups in the cellulose may be 1.5 or more and 2.7 or less, 1.6 or more and 2.5 or less, or 1.7 or more and 2.3 or less.

Consequently, the strength and shock resistance of the molded product manufactured using the molding material can be more improved, and the moldability during manufacturing the molded product can be more improved.

$R_c$ in the formula (2) is an alkylene group having 3 to 6 carbon atoms and may be an alkylene group having 3 to 5 carbon atoms or an alkylene group having 3 or 4 carbon atoms.

Consequently, the strength and shock resistance of the molded product manufactured using the molding material can be more improved, and the moldability during manufacturing the molded product can be more improved.

IL in the formula (2) is represented by either the formula (3) or the formula (4) and may be represented by the formula (3).

Consequently, the strength and shock resistance of the molded product manufactured using the molding material can be more improved.

The integer n in the formula (3) is an integer of 1 or more and 5 or less and may be an integer of 1 or more and 4 or less or 2 or 3.

Consequently, the strength and shock resistance of the molded product manufactured using the molding material can be more improved, and the moldability during manufacturing the molded product can be more improved.

When IL in the formula (2) is represented by the formula (3), the specific cellulose derivative has a counter ion corresponding to the cation in the formula (3).

Examples of the counter ion include those represented by the following formulae (5) to (11):

(5)

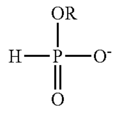

-continued (6)

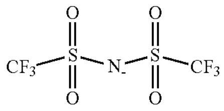

(7)

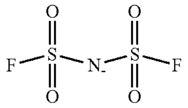

(8)

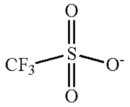

(9)

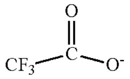

(10)

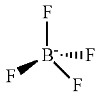

(11)

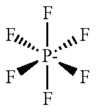

In particular, the counter ion may be that represented by the formula (5).

Consequently, the strength and shock resistance of the molded product manufactured using the molding material can be more improved, and the moldability during manufacturing the molded product can be more improved.

The integer n in the formula (4) is an integer of 1 or more and 8 or less and may be an integer of 2 or more and 7 or less, 3 or more and 6 or less, or 3 or more and 5 or less.

Consequently, the strength and shock resistance of the molded product manufactured using the molding material can be more improved, and the moldability during manufacturing the molded product can be more improved.

The specific cellulose derivative may have chemical structures having different conditions with each other in the molecule as the chemical structures represented by the above formula (2).

In the specific cellulose derivative, the DS value of the chemical structure represented by the formula (2), that is, the substitution degree that is the value corresponding to the number of hydrogen atoms that have been substituted with the chemical structure represented by the formula (2) in the hydrogen atoms of all the hydroxy groups in the cellulose may be 0.05 or more and 0.5 or less, 0.1 or more and 0.4 or less, or 0.15 or more and 0.35 or less.

Consequently, the strength and shock resistance of the molded product manufactured using the molding material can be more improved, and the moldability during manufacturing the molded product can be more improved.

In particular, in the specific cellulose derivative, when the DS value of a chemical structure represented by the formula (1) and the DS value of a chemical structure represented by the formula (2) satisfy the above-described conditions, the above-described effects can be more significantly exhibited.

In the specific cellulose derivative, the total value of the DS values of all substituents, that is, the substitution degree that is the value corresponding to the number of hydrogen atoms that have been substituted with substituents in the hydrogen atoms of all the hydroxy groups in the cellulose may be 1.6 or more and 3.2 or less, 1.7 or more and 2.9 or less, or 1.9 or more and 2.6 or less.

Consequently, the strength and shock resistance of the molded product manufactured using the molding material can be more improved, and the moldability during manufacturing the molded product can be more improved.

The number average molecular weight of the specific cellulose derivative may be 10,000 or more and 400,000 or less, 20,000 or more and 300,000 or less, or 35,000 or more and 200,000 or less.

Consequently, the affinity and compatibility of the specific cellulose derivative to the cellulose fiber can be more improved, the strength and shock resistance of the molded product manufactured using the molding material can be more improved, and the moldability during manufacturing the molded product can be more improved.

The glass transition temperature of the specific cellulose derivative may be 80° C. or more and 200° C. or less, 90° C. or more and 180° C. or less, or 100° C. or more and 170° C. or less.

Consequently, the affinity and compatibility of the specific cellulose derivative to the cellulose fiber can be more improved, the strength and shock resistance of the molded product manufactured using the molding material can be more improved, and the moldability during manufacturing the molded product can be more improved.

The content of the specific cellulose derivative in the molding material may be 10 mass % or more and 40 mass % or less, 13 mass % or more and 30 mass % or less, or 15 mass % or more and 25 mass % or less.

Consequently, the strength and shock resistance of the molded product manufactured using the molding material can be more improved, and the moldability during manufacturing the molded product can be more improved.

In the molding material, a relationship of $0.14 \leq XD/XC \leq 0.80$, wherein XC [mass %] is the content of the cellulose fiber and XD [mass %] is the content of the specific cellulose derivative, may be satisfied, and a relationship of $0.19 \leq XD/XC \leq 0.60$ or $0.22 \leq XD/XC \leq 0.50$ may be satisfied.

Consequently, the strength and shock resistance of the molded product manufactured using the molding material can be more improved, and the moldability during manufacturing the molded product can be more improved.

[1-3] Second Cellulose Derivative

The molding material of the present disclosure may further include a second cellulose derivative that is at least one selected from the group consisting of cellulose acetate propionate, cellulose acetate butyrate, and cellulose acetate, in addition to the above-described cellulose fiber and specific cellulose derivative.

These second cellulose derivatives are excellent in the affinity and compatibility with the specific cellulose derivative, and the strength and shock resistance of the molded product manufactured using the molding material can be more improved by including such a second cellulose derivative, and the moldability during manufacturing the molded product can be more improved.

The content of the second cellulose derivative in the molding material may be 10 mass % or more and 40 mass % or less, 12 mass % or more and 36 mass % or less, or 14 mass % or more and 32 mass % or less.

Consequently, the strength and shock resistance of the molded product manufactured using the molding material can be more improved, and the moldability during manufacturing the molded product can be more improved.

[1-4] Flame Retardant

The molding material of the present disclosure may further include a flame retardant.

Consequently, the flame retardance of the molded product manufactured using the molding material of the present disclosure can be improved.

Examples of the flame retardant include a bromine flame retardant, a chlorine flame retardant, a phosphorus-containing flame retardant, a silicon-containing flame retardant, a nitrogen compound-based flame retardant, and an inorganic flame retardant.

Among these flame retardants, the flame retardant may be a phosphorus-containing flame retardant or a silicon-containing flame retardant, because they are not thermally decomposed and do not generate a hydrogen halide during mixing and kneading with other components or molding processing and therefore do not corrode the processing machine and molding die and do not deteriorate the working environment. In addition, they are less likely to have an adverse effect on the environment due to diffusion of a halogen or generation of dioxin by decomposition during incineration disposal.

Examples of the phosphorus-containing flame retardant include organic phosphorus compounds such as a phosphoric acid ester, a phosphoric acid condensed ester, and a polyphosphate.

Examples of the phosphoric acid ester include trimethyl phosphate, triethyl phosphate, tributyl phosphate, tri (2-ethylhexyl) phosphate, tributoxyethyl phosphate, triphenyl phosphate, tricresyl phosphate, trixylenyl phosphate, tris (isopropylphenyl) phosphate, tris(phenylphenyl) phosphate, trinaphthyl phosphate, cresy diphenyl phosphate, xylenyl diphenyl phosphate, diphenyl (2-ethylhexyl) phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, and diethyl phenylphosphonate.

Examples of the phosphoric acid condensed ester include aromatic phosphoric acid condensed esters such as resorcinol polyphenyl phosphate, resorcinol poly(di-2,6-xylyl) phosphate, bisphenol A polycresyl phosphate, hydroquinone poly(2,6-xylyl)phosphate, and condensates thereof.

Examples of the phosphoric acid condensed ester also include polyphosphates that are salts of phosphoric acid or polyphosphoric acid and metals of Groups 1 to 14 of the periodic table, ammonia, aliphatic amine, and aromatic amine. Typical examples of the salts of the polyphosphate include metal salts such as a lithium salt, a sodium salt, a calcium salt, a barium salt, an iron (II) salt, an iron (III) salt, and an aluminum salt; aliphatic amine salts such as a methylamine salt, an ethylamine salt, a diethylamine salt, a triethylamine salt, an ethylenediamine salt, and a piperazine salt; and aromatic amine salts such as a pyridine salt and a triazine salt.

In addition to the above, the examples include halogen-containing phosphoric acid esters such as tris(chloroethyl) phosphate, tris(dichloropropyl)phosphate, and tris(β-chloropropyl)phosphate; phosphazene compounds having a structure in which a phosphorus atom and a nitrogen atom are bonded by a double bond; and phosphoric acid ester amides.

Examples of the silicon-containing flame retardant include organic silicon compounds with a two-dimensional or three-dimensional structure, and polydimethylsiloxane and polydimethylsiloxane of which a side-chain or terminal methyl group is substituted or modified with a hydrogen atom or a substituted or unsubstituted aliphatic hydrocarbon group or aromatic hydrocarbon group, i.e., so-called silicone oil or modified silicone oil.

Examples of the substituted or unsubstituted aliphatic hydrocarbon group or aromatic hydrocarbon group include an alkyl group, a cycloalkyl group, a phenyl group, a benzyl group, an amino group, an epoxy group, a polyether group, a carboxyl group, a mercapto group, a chloroalkyl group, an alkyl higher alcohol ester group, an alcohol group, an aralkyl group, a vinyl group, and a trifluoromethyl group.

As flame retardants other than the phosphorus-containing flame retardant and silicon-containing flame retardant, for example, inorganic flame retardants, such as magnesium hydroxide, aluminum hydroxide, antimony trioxide, antimony pentoxide, sodium antimonate, zinc hydroxystannate, zinc stannate, metastannic acid, tin oxide, a tin oxide salt, zinc sulfate, zinc oxide, ferrous oxide, ferric oxide, stannous oxide, stannic oxide, zinc borate, ammonium borate, ammonium octamolybdate, a metal salt of tungstic acid, a complex oxide of tungsten and a metalloid, ammonium sulfamate, ammonium bromide, a zirconium compound, a guanidine compound, a fluorine compound, graphite, and swellable graphite, can be used.

When the molding material includes a flame retardant, the content of the flame retardant can be 1 part by mass or more and 30 parts by mass or less when the total content of the cellulose fiber and the specific cellulose derivative is defined as 100 parts by mass.

Consequently, the flame retardance of the molded product manufactured using the molding material of the present disclosure can be more improved, while more effectively exhibiting the above-described effects of the present disclosure.

[1-5] Antioxidant

The molding material of the present disclosure may further include an antioxidant.

Consequently, the stability of a resin against heating during kneading and a molding process is improved.

Examples of the antioxidant include a phosphorous antioxidant and a hindered phenolic antioxidant (for example, "Irganox 1010", "Irganox 1076", and "Irganox 3114" manufactured by BASF Japan Ltd., and "SUMILIZER GP" manufactured by Sumitomo Chemical Co., Ltd.).

When the molding material includes an antioxidant, the content of the antioxidant can be 0.05 parts by mass or more and 2.0 parts by mass or less when the total mass of the cellulose fiber and the specific cellulose derivative is defined as 100 parts by mass.

Consequently, the scratch resistance and the antifouling property can be more suitably improved while more suitably suppressing decreases in the shock resistance, formability, rigidity, bending strength, heat resistance, and so on of the specific cellulose derivative.

[1-6] Other Components

The molding material of the present disclosure may include other components than the above-mentioned components. Hereinafter, such components will also be referred to as "other components" in this category.

Examples of the other components include a coloring agent, an insect repellent, an antifungal agent, an antibacterial agent, an antistatic agent, a flame-retardant auxiliary, an ultraviolet absorber, an agglomeration inhibitor, a mold release agent, a processing auxiliary, an anti-drip agent, a cellulose derivative other than the above, a resin material, and a plasticizer.

However, the content of the other components in the molding material of the present disclosure can be 10 mass % or less, 5 mass % or less, or 3 mass % or less.

[2] Method for Manufacturing Molding Material

A method for manufacturing the molding material of the present disclosure will now be described.

The molding material of the present disclosure can be manufactured by, for example, mixing the above-described components. In this case, the timing of mixing the components may be the same or may be different.

The molding material of the present disclosure may be manufactured by, for example, kneading the above-described components. The kneading of the components can be performed using, for example, a single-screw kneader, a twin-screw kneader, a multi-screw kneader, a mixer, or a roll banbury machine.

The strand-shaped molding material obtained by kneading may be formed into, for example, a pellet-shaped molding material by pelletizing processing using a pelletizer of a strand system, a watering hot cut system, or the like.

As the method for manufacturing a molding material, the following method may be used. That is, a kneaded product of the above-described components is formed into a sheet shape and then may be formed, for example, into a pellet-shaped molding material by cutting into a desired shape using a shredder. The method for forming a kneaded product into a sheet shape is not particularly limited, but examples thereof include a method by first depositing the kneaded product into a sheet-shaped sediment in the air, compressing the sediment with a calender device to remove the air and increase the density, subsequently heating the compressed sediment by a heating furnace without contact, and then performing heat pressing with a heat press device. The shape and size of the pellet obtained by cutting are not particularly limited, but the pellet can be, for example, an approximate rectangular parallelepiped with one piece length of 2 mm or more and 5 mm or less.

The cellulose fiber that is used for manufacturing the molding material of the present disclosure may be defiberized in advance. In particular, a cellulose fiber source including a cellulose fiber, such as waste paper, may be used after defiberization.

[3] Molded Product

A molded product manufactured using the molding material of the present disclosure will now be described.

The molded product according to the present disclosure includes a cellulose fiber and a specific cellulose derivative, and the content of the cellulose fiber is 50 mass % or more and 70 mass % or less.

The molded product according to the present disclosure can be manufactured using the above-described molding material.

Consequently, it is possible to provide a molded product including a cellulose fiber in a predetermined content range, i.e., a sufficiently high content of 50 mass % or more and 70 mass % or less and having excellent strength and shock resistance.

When a cellulose fiber, which is an abundant natural material derived from plants, is included at a high content, it is possible to appropriately respond to environmental problems and underground resource saving and so on, and also it is advantageous from the viewpoint of stable supply, cost reduction, and so on of a molded product. A cellulose fiber is a component that is found in large amounts in, for example, waste paper and waste cloth in addition to virgin pulp, and is also advantageous from the viewpoint of promoting the effective reuse of resources.

The specific cellulose derivative can be suitably obtained using cellulose such as the above as a raw material, and is a component generally having excellent biodegradability. Consequently, also as an entire molded product, it is possible to appropriately respond to environmental problems and so on.

Each component constituting the molded product can satisfy the conditions described in the paragraphs [1-1] to [1-6] above.

The shape of the molded product is not particularly limited, and may be any of, for example, sheet-like, block-like, spherical, and three-dimensional shapes.

The molded product may be used for any application, and examples of the application include various housings, such as the housing of a printer, ink cartridges, and various containers.

In particular, the molded product according to the present disclosure can be suitably applied to an ink cartridge and so on where dust generation is a particular problem, because the affinity between the cellulose fiber and the specific cellulose derivative is high, and dust generation is effectively prevented.

The molded product according to the present disclosure may be manufactured by any method, but can be suitably manufactured by, for example, injection molding, pressing molding, or the like using the above-described molding material of the present disclosure.

Although the suitable embodiments of the present disclosure have been described above, the present disclosure is not limited thereto.

EXAMPLES

Specific examples of the present disclosure will now be described.

[4] Synthesis of Cellulose Derivative

Synthesis Example 1

A mixture of 1-methylimidazole (manufactured by Tokyo Chemical Industry Co., Ltd., 12.3 g, 150 mmol) and 4-chlorobutanoic acid (manufactured by Tokyo Chemical Industry Co., Ltd., 12.5 g, 100 mmol) was heated at 70° C. overnight while stirring. After completion of the heating, ether was added thereto. The solid oil was washed with ether (100 mL×3). Slightly yellow adhesive oil was dried in vacuum overnight.

A mixture of the obtained 1-(4-carboxybutyl) imidazolium chloride (2.23 g, 50 mmol) and thionyl chloride (47.6 g, 200 mmol) was refluxed at 80° C. for 3 hours. Excessive thionyl chloride was removed under reduced pressure, and distillation was performed to obtain 1H-imidazolium, 3-(4-chloro-4-oxobutyl)-1-methyl-chloride.

Cellulose (manufactured by Nippon Paper Industries Co., Ltd., FLOCK W50, 1.90 g, 11.76 mmol) was placed in a 200-mL three neck flask, and N-methyl-2-pyrrolidinone (manufactured by Kanto Chemical Co., Ltd., 25.4 mL) and pyridine (manufactured by Kanto Chemical Co., Ltd., 3.3 mL) were added thereto as solvents, followed by mechanical stirring at 300 rpm for 4 hours. The inner temperature was cooled to −4° C., and the above 1H-imidazolium, 3-(4-chloro-4-oxobutyl)-1-methyl-chloride (1.31 g, 5.88 mmol) and propionic acid chloride (manufactured by Kanto Chemical Co., Ltd., 3.26 g, 35.27 mmol) were dropwise added thereto, followed by reaction at an inner temperature of 90° C. for 12 hours. The inner temperature was then cooled to 65° C., and methanol (50 mL) was added thereto to stop the reaction. After pure water (10 mL) was added thereto and filtering was performed under reduced pressure, the residue was dispersed and stirred in methanol (25 mL), followed by filtration under reduced pressure. This procedure was repeated 5 times, and vacuum drying was performed for 12 hours.

The obtained solid and methyl hydrogen phosphonate (manufactured by BOC Sciences, 8.8 mL) were mixed at room temperature and reacted at 100° C. for 4 hours.

The reaction solution was charged into a large amount of tetrahydrofuran (manufactured by FUJIFILM Wako Pure Chemical Corporation), and the mixture was vigorously stirred for about 5 minutes and then left to stand. The upper layer separated into two layers was removed by decantation. This procedure was repeated two more times, and the remaining lower layer was heat and vacuum dried at 100° C. while stirring for 1 hour to obtain 16.45 g of a liquid cellulose derivative with wine color at room temperature (25° C., the same hereinafter).

Synthesis Examples 2 to 11

Cellulose derivatives were synthesized as in Synthesis Example 1 except that the types and amounts of the components reacting with cellulose as the raw material were changed such that the configurations of the cellulose derivatives were as shown in FIG. 1.

Synthesis Example 12

A mixture of 4-(1-imidazolyl) butanoic acid (manufactured by BOC Sciences, 150 mmol) and 3-chloropropoxyphosphinic acid (manufactured by Chmazon, 100 mmol) was heated at 70° C. overnight while stirring. After cooling to room temperature, ether was added thereto. The solid oil was washed with ether (100 mL×3). Slightly yellow adhesive oil was dried in vacuum overnight.

A mixture of the obtained betaine carboxylic acid derivative (34.6 g, 50 mmol) and thionyl chloride (23.8 g, 200 mmol) was refluxed at 80° C. for 3 hours. Excessive thionyl chloride was removed under reduced pressure, and the distillation was performed to obtain a betaine acid chloride derivative.

Cellulose (manufactured by Nippon Paper Industries Co., Ltd., FLOCK W50, 1.90 g, 11.76 mmol) was placed in a 200-mL three neck flask, and N-methyl-2-pyrrolidinone (manufactured by Kanto Chemical Co., Ltd., 25.4 mL) and pyridine (manufactured by Kanto Chemical Co., Ltd., 3.3 mL) were added thereto as solvents, followed by mechanical stirring at 300 rpm for 4 hours. The inner temperature was cooled to −4° C., and the above betaine acid chloride derivative (1.83 g, 5.88 mmol) and propionic acid chloride (manufactured by Kanto Chemical Co., Ltd., 3.26 g, 35.27 mmol) were dropwise added thereto, followed by reaction at an inner temperature of 90° C. for 12 hours. The inner temperature was then cooled to 65° C., and methanol (50 mL) was added thereto to stop the reaction. After pure water (10 mL) was added thereto and filtering was performed under reduced pressure, the residue was dispersed and stirred in methanol (25 mL), followed by filtration under reduced pressure. This procedure was repeated 5 times, and vacuum drying was performed for 12 hours to obtain a cellulose derivative.

Synthesis Examples 13 and 14

Cellulose derivatives were synthesized as in Synthesis Example 12 except that the types of the components reacting with cellulose as the raw material were changed such that the configurations of the cellulose derivatives were as shown in FIG. 1.

The conditions of the cellulose derivative synthesized in each Synthesis Example are collectively shown in FIG. 1.

[5] Preparation of Molding Material

Example 1

A cellulose fiber (manufactured by Empresas CMPC S.A., Guaiba BEKP, 60 parts by mass), the cellulose derivative (20 parts by mass) synthesized in Synthesis Example 1, and cellulose acetate propionate (manufactured by Eastman Chemical Company, CAP-482-20, 20 parts by mass) were weighed. Subsequently, these materials were charged and kneaded in a twin-screw kneader (manufactured by Technovel Corporation, KZW15TW-45 MG). The kneading conditions were a maximum heating temperature of 180° C. and an extrusion output of 1 kg/hr. Subsequently, the kneaded material was processed into a strand shape and then into a pellet-shaped molding material with a pelletizer.

Examples 2 to 20

Pellet-shaped molding materials were prepared as in Example 1 except that the types of the components supplied to kneading and the compounding ratio of each component were changed as shown in FIGS. 2 and 3.

Comparative Examples 1 to 3

Pellet-shaped molding materials were prepared as in Example 1 except that the types of the components supplied to kneading and the compounding ratio of each component were changed as shown in FIG. 3.

[6] Manufacturing of Molded Product

The molding materials of Examples 1 to 20 and Comparative Examples 2 and 3 were each injection molded using an injection molding machine (manufactured by Nissei Plastic Industrial Co., Ltd., THX40-5V) to manufacture a molded product for bending elastic modulus evaluation, a molded product for bending strength evaluation, and a molded product for Charpy impact strength evaluation, described later. The heating temperature of the molding materials during injection molding was 200° C. The molded product for bending elastic modulus evaluation and the molded product for bending strength evaluation were each a rectangular plate-shaped molded product with a long side of 80 mm±2 mm, a short side of 10.0 mm±0.2 mm, and a thickness of 4.0 mm±0.2 mm, and the molded product for the Charpy impact strength evaluation was a rectangular plate-shaped molded product with a long side of 80 mm±2 mm, a short side of 4.0 mm±0.2 mm, and a thickness of 10.0 mm±0.2 mm.

The molding material of Comparative Example 1 was press-molded using a pressing apparatus (manufactured by Towa Seiki Co., Ltd., Hydraulic press PHKS-40ABS) to manufacture a molded product for bending elastic modulus evaluation, a molded product for bending strength evaluation, and a molded product for Charpy impact strength evaluation, described later. The heating temperature of the molding materials during pressing molding was 200° C. The molded product for bending elastic modulus evaluation and the molded product for bending strength evaluation were each a rectangular plate-shaped molded product with a long side of 80 mm±2 mm, a short side of 10.0 mm±0.2 mm, and a thickness of 4.0 mm±0.2 mm, and the molded product for the Charpy impact strength evaluation was a rectangular plate-shaped molded product with a long side of 80 mm±2 mm, a short side of 4.0 mm±0.2 mm, and a thickness of 10.0 mm±0.2 mm.

[7] Evaluation

The molded products of Examples and Comparative Examples were subjected to the following evaluations.

[7-1] Bending Elastic Modulus

The bending elastic modulus of each of the molded products for bending elastic modulus evaluation of Examples and Comparative Examples manufactured as described in the above paragraph [6] was measured using 68TM-30 manufactured by Instron in accordance with ISO 178 (JIS K7171) and evaluated according to the following criteria. In the measurement of bending elastic modulus, the distance between fulcrums was set to 64 mm.

A: bending elastic modulus of 2.0 GPa or more;
B: bending elastic modulus of 1.5 GPa or more and less than 2.0 GPa;
C: bending elastic modulus of 1.0 GPa or more and less than 1.5 GPa; and
D: bending elastic modulus of less than 1.0 GPa.

[7-2] Bending Strength

The bending strength of each of the molded products for bending strength evaluation of Examples and Comparative Examples manufactured as described in the above paragraph [6] was measured using 68TM-30 manufactured by Instron in accordance with ISO 178 (JIS K7171) and evaluated according to the following criteria. In the measurement of bending strength, the distance between fulcrums was set to 64 mm.

A: bending strength of 60 MPa or more;
B: bending strength of 40 MPa or more and less than 60 MPa;
C: bending strength of 20 MPa or more and less than 40 MPa; and
D: bending strength of less than 20 MPa.

[7-3] Charpy Impact Strength

The Charpy impact strength of each of the molded products for Charpy impact strength evaluation of Examples and Comparative Examples manufactured as described in the above paragraph [6] was measured using Impact Tester IT manufactured by Toyo Seiki Seisaku-sho, Ltd. in accordance with ISO 179 (JIS K7111) and evaluated according to the following criteria. In the measurement of Charpy impact strength, the weight of the hammer was 4 J (WR 2.14 N/m), the lifting angle was 150°, the remaining notch width was 8.0 mm±0.2 mm, and the notch angle was 45°.

A: Charpy impact strength of 10 $KJ/m^2$ or more;
B: Charpy impact strength of 8 $KJ/m^2$ or more and less than 10 $KJ/m^2$;
C: Charpy impact strength of 6 $KJ/m^2$ or more and less than 8 $KJ/m^2$; and
D: Charpy impact strength of less than 6 $KJ/m^2$.

[7-4] Melt Flow Rate

The melt flow rate of each of the molding materials of Examples and Comparative Examples was determined based on ISO 1133 under conditions of 190° C. and a load of 21.2 N and evaluated according to the following criteria. The larger the value of the melt flow rate, the better the moldability.

A: melt flow rate of 20 g/10 min or more;
B: melt flow rate of 10 g/10 min or more and less than 20 g/10 min;
C: melt flow rate of 5 g/10 min or more and less than 10 g/10 min; and
D: melt flow rate of less than 5 g/10 min.

These results are collectively shown in FIGS. 2 and 3 together with the compositions of the molding materials obtained in Examples and Comparative Examples and the methods for molding the molded products using the molding materials.

In FIGS. 2 and 3, cellulose fiber (manufactured by Empresas CMPC S.A., Guaiba BEKP) is shown as "Cellulose fiber", cellulose acetate propionate (manufactured by Eastman Chemical Company, CAP-482-20) is shown as "CAP", cellulose acetate butyrate (manufactured by Eastman Chemical Company, CAB-381-20) is shown as "CAB", cellulose acetate (manufactured by Daicel Miraizu Ltd., DAC: L-70) is shown as "DAC", triphenyl phosphate is shown as "Flame retardant", Irganox (registered trademark) 1010 is shown as "Antioxidant", and melt flow rate is shown as "MFR". The numerical value for each component in FIGS. 2 and 3 indicates the content in terms of mass %.

As obvious from FIGS. 2 and 3, excellent results were obtained in each Example. In contrast, in Comparative Examples, satisfactory results were not obtained.

What is claimed is:

1. A molding material comprising:
a cellulose fiber; and
a specific cellulose derivative in which a part of hydrogen atoms constituting hydroxy groups of cellulose is substituted with a chemical structure represented by a following formula (1) and another part of the hydrogen atoms is substituted with a chemical structure represented by a following formula (2), wherein
a content of the cellulose fiber is 50 mass % or more and 70 mass % or less:

$$—(C{=}O)R_B \qquad (1)$$

wherein, $R_B$ is an alkyl group having 1 to 6 carbon atoms;

$$—(C{=}O)R_C—IL \qquad (2)$$

wherein, $R_C$ is an alkylene group having 3 to 6 carbon atoms, and IL is represented by either a formula (3) or a formula (4);

(3)

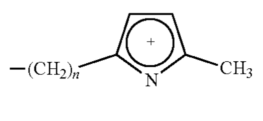

wherein, n is an integer of 1 or more and 5 or less; and (4)

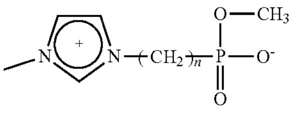

wherein, n is an integer of 1 or more and 8 or less.

2. The molding material according to claim 1, wherein a content of the specific cellulose derivative is 10 mass or more and 40 mass % or less.

3. The molding material according to claim 1, wherein $0.14 \leq XD/XC \leq 0.80$, where XC [mass %] is a content of the cellulose fiber, and XD [mass %] is a content of the specific cellulose derivative in the molding material.

4. The molding material according to claim 1, further comprising:

a second cellulose derivative that is at least one selected from the group consisting of cellulose acetate propionate, cellulose acetate butyrate, and cellulose acetate.

5. The molding material according to claim 4, wherein a content of the second cellulose derivative is 10 mass % or more and 40 mass % or less.

6. The molding material according to claim 1, wherein in the specific cellulose derivative, a DS value of the chemical structure represented by the formula (1) is 1.5 or more and 2.7 or less, and a DS value of the chemical structure represented by the formula (2) is 0.05 or more and 0.5 or less.

* * * * *